(12) United States Patent
Kardach

(10) Patent No.: US 7,165,134 B1
(45) Date of Patent: Jan. 16, 2007

(54) SYSTEM FOR SELECTIVELY GENERATING REAL-TIME INTERRUPTS AND SELECTIVELY PROCESSING ASSOCIATED DATA WHEN IT HAS HIGHER PRIORITY THAN CURRENTLY EXECUTING NON-REAL-TIME OPERATION

(75) Inventor: James P. Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 09/606,839

(22) Filed: Jun. 28, 2000

(51) Int. Cl.
*G06F 9/48* (2006.01)
*G06F 9/44* (2006.01)

(52) U.S. Cl. .................. 710/264; 710/260; 710/262

(58) Field of Classification Search ............... 709/100, 709/101, 102, 103, 105, 106; 703/17; 713/501; 718/100, 101, 102, 103, 104, 105, 106; 710/260, 710/262, 264, 269, 48, 49, 50; 712/228, 712/244

See application file for complete search history.

(56) References Cited

U.S. PATENT DOCUMENTS

| 3,877,021 | A | * | 4/1975 | Raamot ..................... 341/127 |
| 5,603,035 | A | | 2/1997 | Erramoun et al. |
| 5,764,852 | A | * | 6/1998 | Williams .................... 704/243 |
| 5,764,953 | A | * | 6/1998 | Collins et al. ................. 703/17 |
| 5,774,701 | A | * | 6/1998 | Matsui et al. ................. 713/501 |
| 6,035,321 | A | * | 3/2000 | Mays .......................... 709/103 |
| 6,154,832 | A | * | 11/2000 | Maupin ....................... 712/228 |
| 6,295,574 | B1 | * | 9/2001 | MacDonald ................. 710/261 |
| 6,490,611 | B1 | * | 12/2002 | Shen et al. .................. 718/103 |

FOREIGN PATENT DOCUMENTS

| EP | 0742522 A | 11/1996 |
| GB | EP 0 742 522 A1 * | 11/1996 |
| WO | WO 98/09225 | 3/1998 |
| WO | WO 99/14679 A | 3/1999 |

OTHER PUBLICATIONS

Perfoemance of REAL/IX Fully Preemptive Real Time UNIX, Borko Furht et al. Oct. 1989 ACM SIGOPS Operating System Review, vol. 23, Issue 4.*
International Search Report, PCT/US01/18679, Jan. 17, 2003.

* cited by examiner

*Primary Examiner*—Thomas Lee
(74) *Attorney, Agent, or Firm*—Blakely, Sokoloff, Taylor & Zafman LLP

(57) ABSTRACT

A method is disclosed. The method includes receiving real-time data at a personal computer implementing a general purpose operating system, generating a real-time event at the personal computer and determining whether the real-time event has a higher priority than a first event being processed at the personal computer. If the real-time event has a higher priority than the first event being processed, the real-time event is processed.

13 Claims, 3 Drawing Sheets

US 7,165,134 B1

SYSTEM FOR SELECTIVELY GENERATING REAL-TIME INTERRUPTS AND SELECTIVELY PROCESSING ASSOCIATED DATA WHEN IT HAS HIGHER PRIORITY THAN CURRENTLY EXECUTING NON-REAL-TIME OPERATION

FIELD OF THE INVENTION

The present invention relates to computer systems; more particularly, the present invention relates to executing real-time applications at a computer system.

BACKGROUND

Currently, personal computers are used for various applications in order to simplify tasks to be performed by a user. Nevertheless, conventional personal computers are unable to perform real-time applications. A real-time application is one in which the correctness of computations performed by a computer not only depends upon logical correctness of the computation, but also upon the time at which the result is produced. If the timing constraints are not met, the system fails. For example, in a patriot missile application, a patriot must locate an incoming missile on a radar detection system and fire a defense missile before the incoming missile can destroy its target.

It is difficult to execute real-time operations on conventional computer systems operating with general-purpose operating systems such as Windows 98® or Windows NT® because general-purpose operating system kernels do not have the capability to respond to events within a given time restriction. In addition, the hardware platforms of typical computer systems do not generate events within the resolution of time required for execution.

In an operating system like Windows 98® there are no rules as to how application drivers are to treat events. For example, in some instances drivers may shut off a received event for up to five seconds before the event is processed. It is apparent that such a delay would be unacceptable for a real-time operation. Therefore, it would be desirable to provide real-time function to a general purpose operating system.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for providing real-time operation in a personal computer system is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
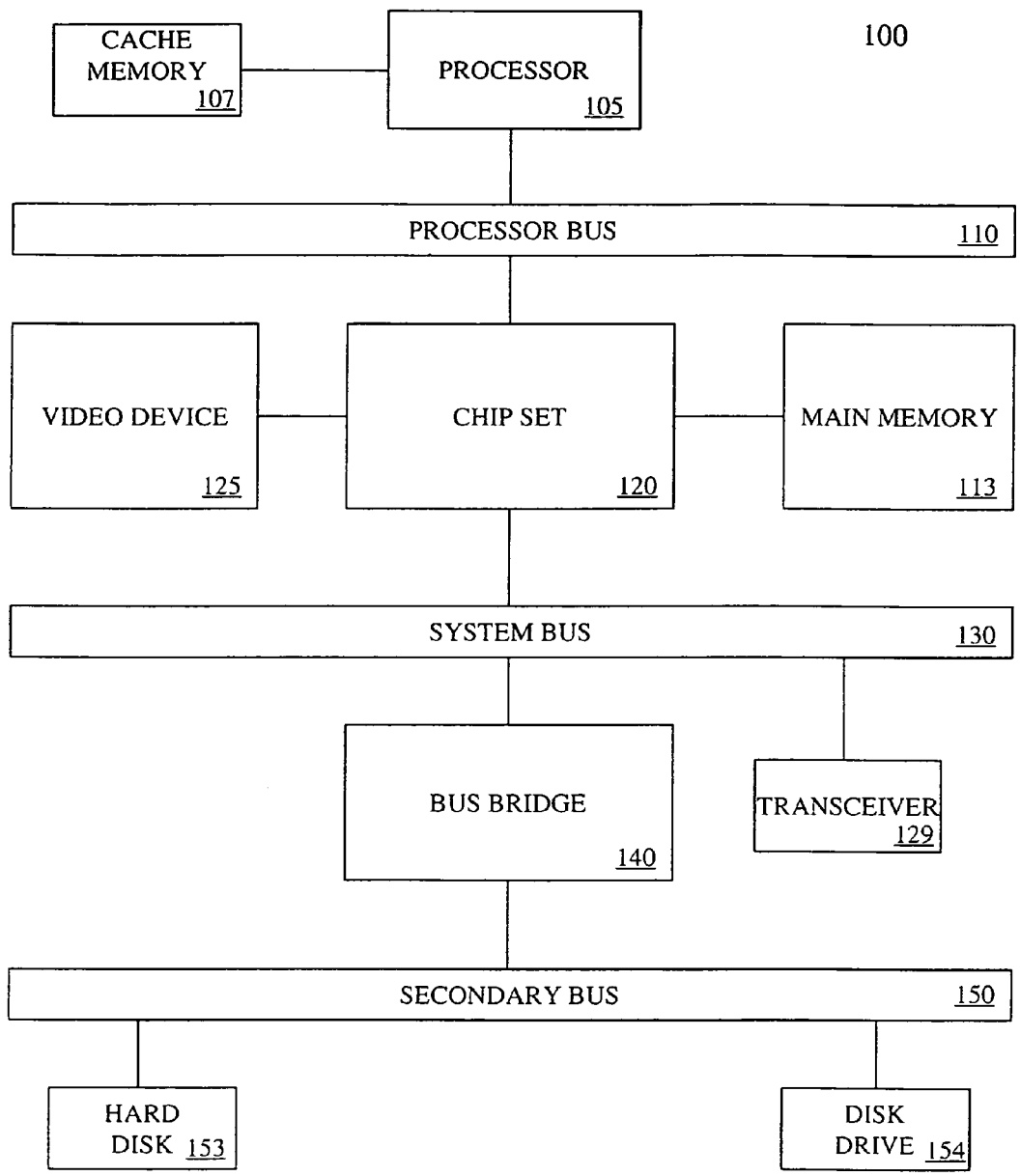
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is an Intel architecture processor in the Pentium® family of processors including the Pentium® II family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus. Cache memory 107 is optional and is not required for computer system 100.

Chip set 120 is also coupled to processor bus 110. In one embodiment, chip set 120 is the 440BX chip set available from Intel Corporation; however, other chip sets can also be used. Chip set 120 may include a memory controller for controlling a main memory 113. Further, chipset 220 may also include an Accelerated Graphics Port (AGP) Specification Revision 2.0 interface 320 developed by Intel Corporation of Santa Clara, Calif. AGP interface 320 is coupled to a video device 125 and handles video data requests to access main memory 113.

Main memory 113 is coupled to processor bus 110 through chip set 120. Main memory 113 and cache memory 107 store sequences of instructions that are executed by processor 105. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110. Video device 125 is also coupled to chip set 120. In one embodiment, video device includes a video monitor such as a cathode ray tube (CRT) or liquid crystal display (LCD) and necessary support circuitry.

Processor bus 110 is coupled to system bus 130 by chip set 120. In one embodiment, system bus 130 is a Peripheral Component Interconnect (PCI) bus adhering to a Specification Revision 2.1 bus developed by the PCI Special Interest Group of Portland, Oreg.; however, other bus standards may also be used. Multiple devices, such as audio device 127, may be coupled to system bus 130. According to one embodiment, a radio transceiver 129 is coupled to system bus 130. Radio transceiver 129 may be used to implement a communication interface between computer system 100 and a remote device (not shown).

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

According to one embodiment, computer system 100 includes as a real-time operating system integrated with a general-purpose operating system. For example, computer system 100 enables processor 105 to execute real-time applications (e.g., radio communication systems) using the Windows 98® operating system developed by Microsoft Corporation of Redmond, Wash. However, one of ordinary skill in the art will appreciate that computer system 100 may be implemented using other general-purpose operating systems. Real-time applications are applications that have time constraints on aspects of their behavior. If the constraints are not met, the application either fails or needs to adapt gracefully to the operating conditions.

Figure 2:
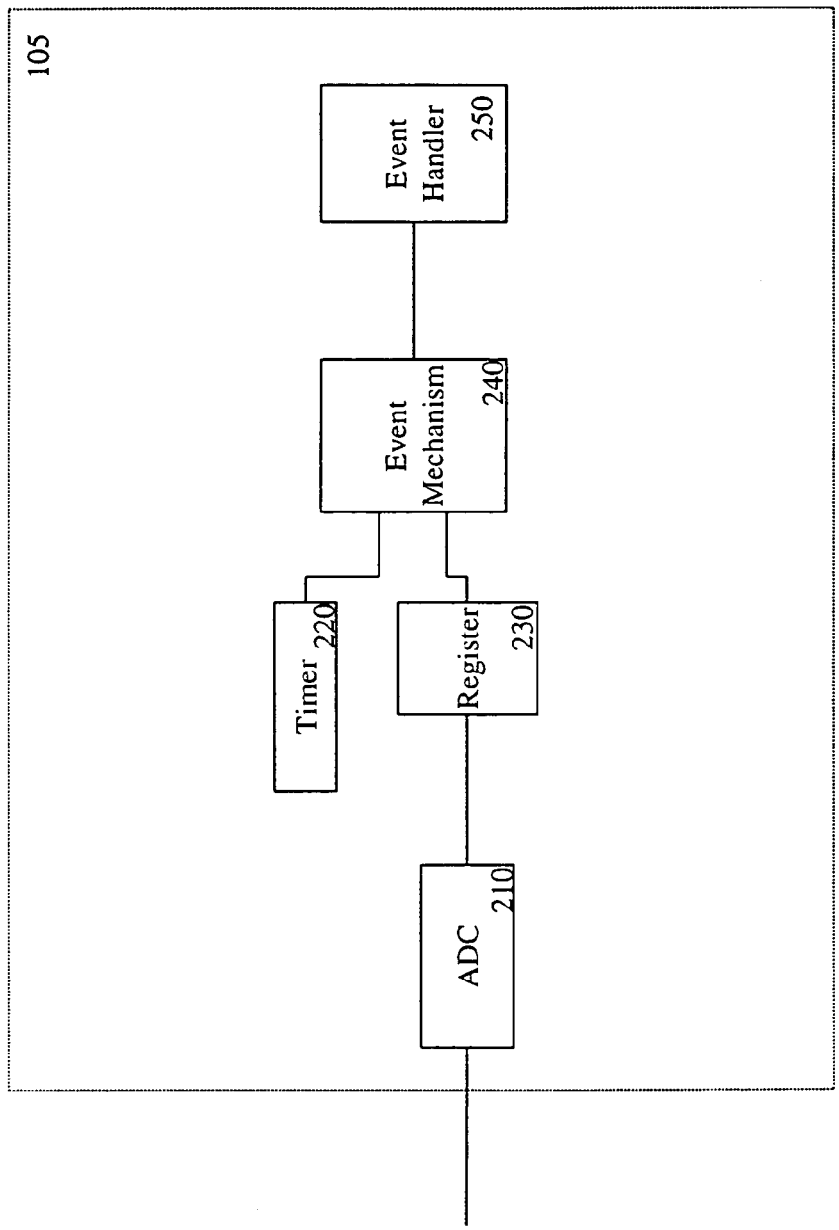
FIG. 2 is a block diagram of one embodiment of a processor.

FIG. 2 is a block diagram of one embodiment of processor 105. Processor 105 includes an analog to digital converter (ADC) 210, a timer 220, register 230, event mechanism 240 and event handler 250. ADC 210 samples real time analog data received at computer system 100 and converts the data into a digital format. According to one embodiment, ADC 210 is coupled to and receives the analog data from transceiver 129 (FIG. 1).

Timer 220 is used as a mechanism to generate timer interrupts at event mechanism 240. According to one embodiment, timer 220 transmits a signal to event mechanism 240 at predetermined intervals. The signal indicates that mechanism 240 is to generate a timer interrupt. According to one embodiment, timer interrupts are generated every 5 milliseconds. However, one of ordinary skill in the art will appreciate that other time intervals may be used to generate timer interrupts.

Register 230 is coupled to ADC 210. Register 230 stores data received from ADC 210 that is to later be processed at CPU 105. Event mechanism 240 is coupled to timer 220 and register 230. As described above, event mechanism 240 generates real-time timer interrupts. The timer interrupts are examined by event handler 250. The timer interrupts indicate to event handler 250 when there is likely a need for real-time data too be serviced.

Event handler 250 processes real-time interrupts received from event mechanism 240. Upon detecting a timer interrupt, event handler 250 verifies whether there is data stored in register 230 that needs to be serviced. However, prior to the service of data within register 230, event handler 250 must determine the priority of the timer interrupt relative to other interrupts received at processor 105.

Typically, interrupts are called in response to a hardware interrupt or software event. An application or device requesting service, or actually being serviced, is serviced in entirety, provided another interrupt with a higher priority requests service. According to one embodiment, if an interrupt with a higher priority requests service, the higher priority request will preempt the lower priority interrupt. The lower priority interrupt will continue upon completion of the higher priority interrupt. A timer interrupt functions in the same manner as ordinary interrupts, except that they are called in response to timer 220.

According to one embodiment, timer interrupts (e.g., real-time events) are given a high priority with respect to other events that request service at processor 105. For example, timer interrupts have a higher priority than non-critical interrupts (e.g., system management interrupts), and a lower priority than critical interrupts (e.g., non-maskable interrupts).

Figure 3:
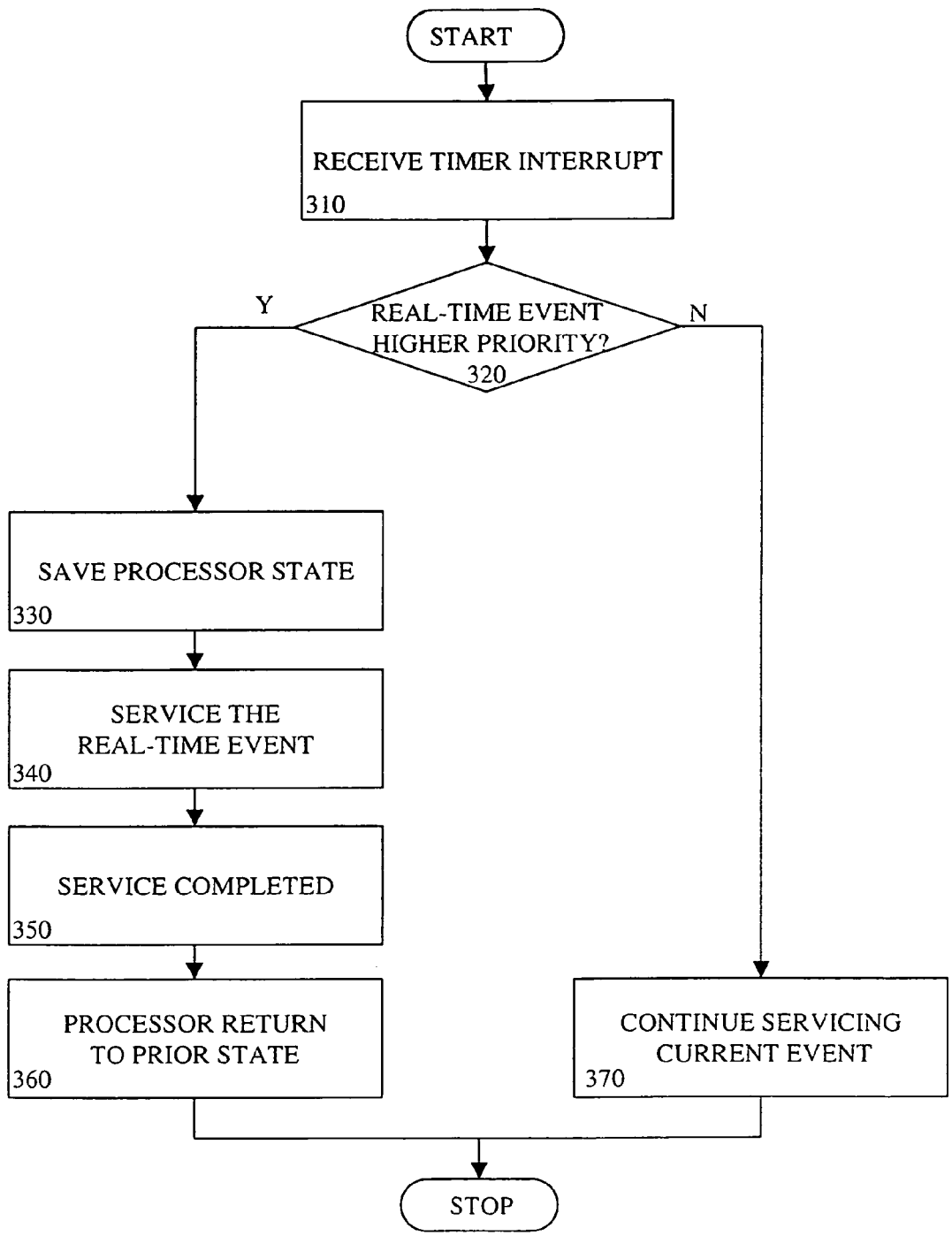
FIG. 3 is a flow diagram for one embodiment of the operation of an event handler.

FIG. 3 is a flow diagram of one embodiment of the operation of event handler 250 upon receiving a real-time event. At process block 310, event handler 250 receives a timer interrupt from event mechanism 240. At process block 320, event handler 250 determines whether the real-time event performed by processor 105 has a higher priority than the current operation. If the current operation performed by processor 105 does not have a higher priority than the real-time event, the current state of processor 105 is saved, process block 330. Therefore, the current operations being executed by processor 105 is set-aside for later execution.

At process block 340, processor 105 services the real-time event. At process block 350, service of the real-time event by processor 105 is completed. At process block 360, processor 105 is returned to its state prior to receiving the timer interrupt. If the current operation performed by processor 105 does have a higher priority than the real-time event, processor 105 continues servicing the current operation, process block 370.

The present invention enables processor 105 to process real-time events within an acceptable latency period. As a result, processor 105 is capable of emulating application protocols that are typically carried out by digital signal processors.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
   receiving real-time analog data at a personal computer implementing a general purpose operating system;
   converting the real-time analog data to digital data;
   storing the digital data at a register;
   receiving a timing signal at an event mechanism at a predetermined interval;
   determining, by the event mechanism, whether data is stored within the register;
   generating real-time interrupts indicating a request to process the real time data at a central processing unit (CPU) if data is stored in the register in response to receiving the timing signals;
   determining whether a currently received real-time interrupt has a higher priority than a non-real time operation currently being processed at the CPU; and
   processing the real-time data if the real-time interrupt has a higher priority than the non-real time operation.

2. The method of claim 1 further comprising continuing to process the non-real time operation if the real-time interrupt does not have a higher priority than the non-real time operation.

3. The method of claim 1 further comprising:
   saving the state of the non-real time operation at the personal computer prior to processing the data associated with the real-time interrupt; and
   processing the non-real time operation after processing of the data associated with the real-time interrupt has been completed.

4. The method of claim 1 further comprising:
   receiving a non-real time interrupt while processing the real-time interrupt; and
   determining whether the non-real time interrupt has a higher priority than the real-time interrupt.

5. The method of claim 4 further comprising:
continuing the processing of the real-time interrupt if the non-real time interrupt does not have a higher priority than the real time interrupt.

6. The method of claim 4 further comprising:
terminating the processing of the real-time interrupt if the non-real time interrupt has a higher priority; and
processing the non-real time interrupt.

7. A computer system comprising:
a chipset;
a bus coupled to the chipset; and
a central processing unit (CPU), coupled to the bus, to process data associated with a currently received real-time interrupt if the currently received real-time interrupt has a higher priority than a non-real-time operation currently being processed,
wherein said central processing unit further comprises a converter to convert received real-time analog data to digital data, a register to store the digital data, a timer to generate timing signals at predetermined time intervals, and an event mechanism coupled to the timer to generate real time interrupts if digital data is stored in the register in response to receiving the timing signals.

8. The computer system of claim 7 wherein the CPU further comprises an event handler coupled to the event mechanism to process the real-time interrupts.

9. The computer system of claim 8 wherein the event mechanism determines the relative priority between the real-time interrupts and the non-real-time operations.

10. The computer system of claim 7 wherein the real-time analog data is data received from an analog radio.

11. A central processing unit (CPU) comprising:
a timer to generate timing signals at predetermined time intervals;
converter to convert received real-time analog data into digital data;
a register to store the digital data;
an event mechanism coupled to the timer and the register to generate real-time interrupts in response to receiving the timing signals and determining that real-time data is stored within the register; and
an event handler coupled to the event mechanism to process data associated with a real-time interrupt currently received from the event mechanism upon determining the relative priority between the currently received real-time interrupt and non-real-time operations currently being processed.

12. The CPU of claim 11 wherein the real-time analog data is data received from an analog radio coupled to the CPU.

13. The CPU of claim 11 wherein the event handler determines the priority of the real-time interrupt relative to other interrupts received.

* * * * *